United States Patent [19]

Kneafsey

[11] Patent Number: 5,683,536

[45] Date of Patent: Nov. 4, 1997

[54] METHOD OF BONDING PVC

[75] Inventor: Brendan J. Kneafsey, Lucan, Ireland

[73] Assignee: Loctite Ltd., Ireland

[21] Appl. No.: 404,223

[22] Filed: Mar. 15, 1995

Related U.S. Application Data

[63] Continuation-in-part of Ser. No. 173,267, Dec. 23, 1993, Pat. No. 5,523,347, which is a continuation of Ser. No. 847,157, Mar. 5, 1992, abandoned.

[30] Foreign Application Priority Data

| Mar. 6, 1991 | [IE] | Ireland | 0741/91 |
| Mar. 6, 1991 | [IE] | Ireland | 0742/91 |
| Feb. 13, 1992 | [IE] | Ireland | 920471 |
| Mar. 16, 1994 | [IE] | Ireland | 940241 |

[51] Int. Cl.[6] .................. C09S 5/00; C09S 133/10
[52] U.S. Cl. ................................................. 156/327
[58] Field of Search .............................. 156/281, 332, 156/305, 327, 307.3

[56] References Cited

U.S. PATENT DOCUMENTS

| 1,780,334 | 11/1930 | Burnett et al. |  |
| 2,478,066 | 8/1949 | van Peski. |  |
| 2,601,293 | 7/1952 | Howard. |  |
| 3,987,019 | 10/1976 | Gruber et al. | 526/328 |
| 3,988,507 | 10/1976 | Gruber et al. | 526/328 |
| 3,991,261 | 11/1976 | Gruber et al. | 526/328 |
| 4,287,255 | 9/1981 | Wong. |  |
| 4,395,301 | 7/1983 | Bauer | 156/307.5 |
| 4,395,361 | 7/1983 | Eickhoff et al. | 252/431 |
| 4,401,793 | 8/1983 | Chiao | 525/285 |
| 4,430,480 | 2/1984 | Melody et al. | 525/160 |
| 4,450,030 | 5/1984 | Melody et al. |  |
| 4,452,955 | 6/1984 | Boeder | 525/518 |
| 4,855,373 | 8/1989 | Wolf et al. | 526/218.1 |
| 4,950,701 | 8/1990 | Okamura | 524/237 |
| 5,045,614 | 9/1991 | Buchholz et al. | 526/219.5 |

FOREIGN PATENT DOCUMENTS

| 0169702 | 1/1986 | European Pat. Off. | C08F 4/00 |
| 287796 | 10/1983 | Germany | G03C 1/68 |
| 040912 | 11/1976 | Japan. |  |
| 1157436 | 7/1969 | United Kingdom | C08F 1/02 |
| 1300387 | 12/1972 | United Kingdom | C08F 1/04 |
| 2087906 | 1/1982 | United Kingdom | C09J 3/14 |

Primary Examiner—Christopher Henderson
Attorney, Agent, or Firm—Steven C. Bauman; Eugene F. Miller

[57] ABSTRACT

One-part, anaerobically storage stable, air activated polymerizable compositions containing methylmethacrylate monomer having a polymeric filler therein, especially polymethylmethacrylate, are found to be especially useful for bonding PVC.

3 Claims, No Drawings

METHOD OF BONDING PVC

This application is a continuation-in-part of U.S. application No. 08/173,267, filed Dec. 23, 1993 (now U.S. Pat. No. 5,523,347), which is a continuation of U.S. application No. 07/847,157, filed Mar. 5, 1992, now abandoned.

This invention relates to a method of bonding polyvinyl chloride (PVC) using an air-activatable polymerisable composition, to compositions for use in the method, and to the manufacture thereof.

EP-A-0,502,733 of the present Applicants (which is incorporated herein by reference) describes a one-part, air-activatable polymerisable composition comprising:
(a) at least one free-radically polymerisable monomer such as a methacrylate and;
(b) an activator system for effective polymerisation of the free radically polymerisable monomer, said activator system comprising an auto-oxidisable compound of a kind specified therein, alone or in a combination with a weak acid. Among thirty-four Examples therein, Example 24 describes a formulation comprising N-phenyl-2-propyl-3, 5-diethyl-1,2-dihydropyridine (0.5 g) as the auto-oxidisable compound, hydroxypropyl methacrylate (4.05 g), 4.5 g of a solution of polymethyl methacrylate (30%) in methyl methacrylate, acrylic acid (0.5 g) and iron (III) acetylacetonate (0.1% solution in hydroxy propyl methacrylate 0.5 g). The performance of this formulation, like that of other formulations in EP-A-0,502,733 is tested on mild steel laps.

It is desirable to extend the use of air-activatable adhesives to the bonding of a PVC substrate to another substrate of the same or different material. However this presents special problems. Compositions based on hydroxylated methacrylate or dimethacrylate monomers show poor adhesion to PVC.

A monomethacrylate will have improved adhesion due to its ability to swell PVC, but the rate of cure is generally slow and the monomer has high volatility and an unacceptable smell.

The present invention provides a method of bonding a PVC substrate to another substrate of the same or different material comprising coating at least one of the substrates with a one-part, air-activatable, polymerisable composition comprising:
(a) one or more free-radically polymerisable monomers including methylmethacrylate having a polymeric filler dissolved therein, and;
(b) an activator system for effective polymerisation of the free-radically polymerisable monomer(s) said activator system comprising at least one auto-oxidisable compound of a formula which includes the structure I:

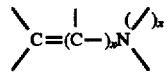

where x is 0 or 1, and where the lines representing unfilled valencies indicate bonds to carbon, hydrogen or hetero atoms, alone or in combination with a weak acid; with the proviso that:
when x=0, the nitrogen atom in structure I is not bonded to a second nitrogen atom;
and when x=1 there is a structure I in the compound in which the >C=C< moiety does not form part of a phenyl ring;
with the proviso that the composition does not contain a peroxide, or a peroxide precursor which produces peroxide in the absence of air or any ingredient which is a significant source of radicals in the absence of air;
exposing the composition to oxygen for sufficient time to activate polymerisation; and bringing the two substrates together.

Typically at least about 5 seconds but preferably at least 30 seconds exposure to air would be suitable.

In one aspect, the invention provides an air-activatable polymerisable composition for use in the bonding of a PVC substrate to another substrate of the same or different material, comprising:
(a) one or more free-radically polymerisable monomers including methylmethacrylate having a polymeric filler dissolved therein but excluding hydroxyl-containing (meth)acrylate monomers, and;
(b) an activator system for effective polymerisation of the free-radically polymerisable monomer(s) said activator system comprising at least one auto-oxidisable compound of a formula which includes the structure I:

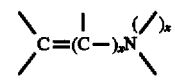

where x is 0 or 1, and where the lines representing unfilled valencies indicate bonds to carbon, hydrogen or hetero atoms, alone or in combination with a weak acid;
with the proviso that:
when x=0, the nitrogen atom in structure I is not bonded to a second nitrogen atom;
and when x=1 there is a structure I in the compound in which the >C=C< moiety does not form part of a phenyl ring;
with the proviso that the composition does not contain a peroxide, or a peroxide precursor which produces peroxide in the absence of air or any ingredient which is a significant source of radicals in the absence of air.

In another aspect the invention relates to the use of a solution of a polymeric filler in methylmethacrylate in the manufacture of an air-activatable polymerisable composition for bonding PVC.

The polymeric filler dissolved in the ethylmethacrylate reduces volatization and increases the viscosity of the monomer. The filler may be with or without functionality and may be coreactive with the methylmethacrylate or may be inert. The preferred filler is poly(methylmethacrylate) which may suitably be of the kind conventionally used in the adhesive industry provided that it is sufficiently soluble in the methyl methyacrylate to give a solution of a viscosity in a range suitable for use as an adhesive, e.g. 200–20,000 mPas. The molecular weight of the polymeric filler is preferably in the range 10,000 to 200,000.

In addition, or as an alternative, to poly(methyl methacrylate) the monomer solution may contain a dissolved copolymer or an elastomer which does not interfere with the polymerisation initiation system or with the stability of the composition. Natural or synthetic elastomers which are soluble in methylmethacrylate may be used, for example polybutadiene, butadiene/acrylonitile copolymers, elastomeric polyacrylates, polyisoprene, polychloroprene or polyurethane elastomers (see U.S. Pat. Nos. 4,112,013; 4,182,644; 4,451,815; and 4,645,810; and IT-A-19950 A/88 and 22141A/90). Other suitable materials include those listed as domain-providing fillers in U.S. Pat. No. 4,963,220 i.e. vinyl polymers, acrylic polymers other than poly (methylmethacrylate), polyester elastomer, glycol polymers, acrylated epoxies, natural and synthetic rubbers; styrenebutadiene-styrene block copolymers such as the Kraton or Kraton G (Trade Marks) polymers that are described in U.S. Pat. Nos. 3,646,162 and 3,595,942; and acrylic or methacrylic grafted polymer of conjugated diene, especially core-shell polymers of the type available from Rohm & Haas, for example Acryloid KM 653, Acryloid KM330 and Acryloid KM611. In general the last-mentioned polymers contain units derived from butadeine or isoprene, alone, or in combination with a vinyl aromatic compound; they are believed to be disclosed in U.S. Pat. Nos. 4,180,494, 3,308, 180, 4,096,202 and 4,260,693. All of the Patents mentioned in the foregoing paragraph are incorporated herein by reference.

The polymeric filler may be a polymeric acid which may partly or wholly replace a weak acid in the composition. The presence of a weak acid is generally preferred for the reasons explained in One or more further free-radically polymerisable monomers may be used in the composition, in addition to methylmethacrylate. Suitable monomers are described in EP-A-0,502,733 and include acrylates, methacrylates, styrene, maleate esters, fumarate esters, unsaturated polyester resins, alkyd resins, thiol-ene compositions and acrylate, methacrylate or vinyl terminated resins including silicones and urethanes. Hydroxyl-containing methacrylates may be used, especially hydroxyalkyl methacrylates such as hydroxypropyl methacrylate, but a hydroxyl-containing monomer should not exceed 50% by weight of the monomers, preferably 10–15%.

The solution of the polymeric filler in methyl methacrylate may suitably contain about 2.5% to about 75% by weight of polymeric filler, preferably about 5% to about 50%, and most preferably about 10% to about 40% polymeric filler.

The solution of polymeric filler in methyl methacrylate may suitably comprise about 10% to about 90%, preferably about 25% to about 85%, by weight of the composition.

The presence of a weak acid is generally preferred in order to achieve a satisfactory rate of auto-oxidation for most of the auto-oxidisable compounds exemplified in EP-A-0,502,733. However it has been observed that certain of the auto-oxidisable compounds, for example the condensation products of urea and cyclic ketones described herein, are air-activated sufficiently well in the absence of acid, although the rate of activation is slower than in the presence of acid. A slower rate of activation and therefore a slower rate of cure of the composition may be desirable in some end-use applications. Nevertheless the presence of a weak acid is generally preferred, even in the case of auto-oxidisable compounds which react with oxygen in the absence of acid, in order to improve solubility of the auto-oxidisable compound in the monomer.

The composition will generally also comprise one or more soluble ionic salts. Preferred ionic salts are metal salts of the type generally used in oil drying technology. The metals should have several valency states and suitable metal salts are those of multivalent metals, especially transition metals. The metal salt or salts must be at least partially soluble in the composition, and may be present in the composition in an effective amount which is generally in a range of between about 1 and about 1,000 parts per million, preferably about 3–300, more preferably 30 to 200 ppm. Alternatively a metal salt in the environment, e.g. on a substrate to which the composition is applied, may participate in initiation of the polymerisation.

The presence of a metal salt is desirable, particularly for improving storage stability of the compositions. An excess of metal salt can interfere with air-activation of the compositions. Iron, cobalt, manganese and vanadium salts are preferred. In addition, compounds of these metals can be mixed with each other, or with one or more other metallic components such as lead, cerium, copper, calcium, barium, zinc and/or zirconium. A mixture of two ionic salts, e.g. salts of cobalt and iron, may have a synergistic effect in certain proportions e.g. a Co:Fe ratio from 9:1 to 1:1. Ionic salts capable of increasing the ionic strength of the formulation also show activity in air activatable adhesive formulations. Typical of these materials are quaternary alkyl ammonium salts, and organic soluble salts of tin, calcium and aluminum.

Metal naphthenates or metal acetyl acetonates are generally soluble in the composition, but other salts or organometallics may be used if they are sufficiently soluble.

The auto-oxidisable compound may be defined as an autox, capable of reacting with atmospheric oxygen by a free-radical mechanism. The auto-oxidisable compound may have the general formula II:

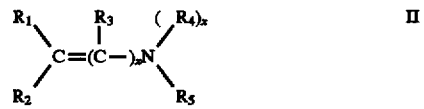

where x is 0 or 1 and $R_1$, $R_2$, $R_3$, $R_4$ and $R_5$, which may be the same or different, are independently selected from hydrogen and hydrocarbyl groups and heterohydrocarbyl groups, silyl groups, and substituted derivatives of the foregoing, and any two of the groups $R_1$ to $R_5$ may together form a mono- or poly-cyclic ring structure, which may optionally be a fused ring structure, or a substituted mono- or poly-cyclic ring structure, which may optionally be a fused ring structure, with the proviso that none of the groups $R_1$ to $R_5$ comprise or contain a group which is known to interfere with polymerisation, and with the same provisos as defined above with respect to the compound of a formula which includes the structure I.

Preferably $R_2$ and $R_5$ form a ring structure such that the auto-oxidisable compound has the general formula IIa

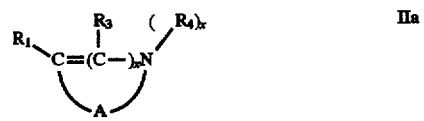

wherein A is a divalent hydrocarbyl or heterohydrocarbyl group, a divalent hydrocarbyl or heterohydrocarbyl group having a cycloaliphatic or aromatic ring fused thereto or a substituted derivative of the foregoing.

The groups $R_1$ and $R_3$ may also suitably form a ring structure.

The term "hydrocarbyl" as used herein includes:
(i) straight chain or branched aliphatic groups including alkyl, alkenyl and alkynyl, preferably containing from 1 to 20, more preferably from 1 to 10, most preferably from 1 to 5 carbon atoms; and alkylene and alkenylene groups forming part of a ring structure which preferably contains from 3 to 30, more preferably 5 to 20 carbon atoms;
(ii) aromatic groups including aryl, alkaryl and aralkyl groups.

The term "heterohydrocarbyl" as used herein includes hydrocarbyl groups as described above interrupted by a hetero atom selected from oxygen, nitrogen or sulphur.

The term "substituted" or "substituted derivative" as used herein includes the appropriate group substituted with one or more oxygen, nitrogen, sulphur or halogen atoms or atom-containing moieties, or with one or more hydrocarbyl or heterohydrocarbyl groups, which in turn may be substituted with one or more oxygen, nitrogen, sulphur or halogen atoms or atom-containing moieties. The halogen may be chlorine, bromine, fluorine or iodine. Exemplary of suitable $R_1$–$R_5$ groups as well as substituents on a ring structure are hydrogen, $C_1$–$C_5$ alkyl, $C_1$–$C_5$ alkoxy, phenyl, alkoxyphenyl, benzyl, cyclohexyl, amide or trialkyl silyl groups.

Suitable auto-oxidisable compounds include partially hydrogenated pyridines, condensation products of cyclic ketones and ureas, Schiff's Bases, indoles, pyrroles, imidazoles, piperazines, carbazoles and tetrahydroquinolines and substituted derivatives thereof. Particularly preferred are dihydropridines having a general formula selected from III:

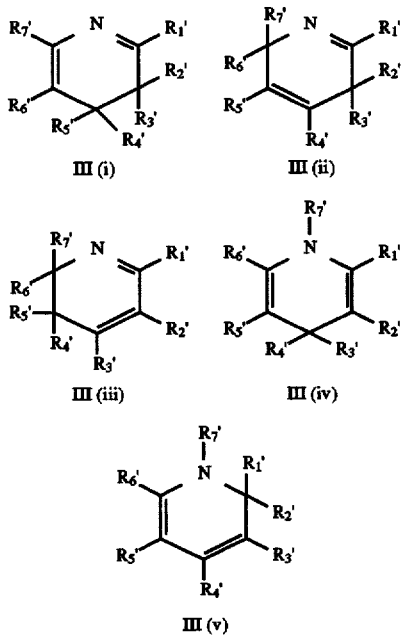

wherein $R_1'$ to $R_7'$ have the same meanings and provisos as $R_1$ to $R_5$ above. Compounds of formula III (iv) and III (v) are preferred, $R_7'$ preferably being other than hydrogen and more preferably being an electron-donating group, or the condensation products of ureas and cyclic ketones having a general formula IIIa:

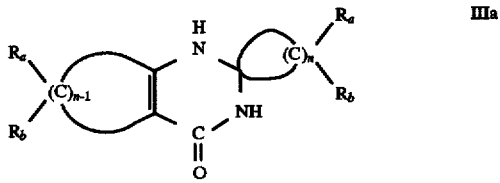

wherein n=4, 5, 6 or 7 and $R_a$ and $R_b$ are as defined for $R_1$ to $R_5$ above, or Schiff's Bases of the formula:

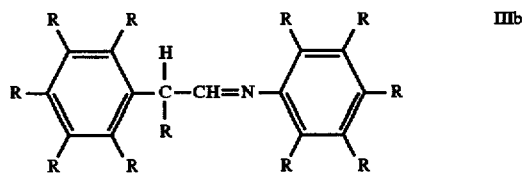

where the R's which may be the same or different are selected from H, alkyl, alkoxy or aromatic groups, and substituted derivatives thereof, wherein alkyl groups or moieties preferably contain from 1 to 20, more preferably from 1 to 10, most preferably from 1 to 5 carbon atoms, and aromatic groups include aryl, alkaryl and aralkyl groups.

Examples of compounds which are suitable for use in the compositions of the invention as auto-oxidisable compounds are set out in EP-A-0,502,733 and include
N-butyl-2-propyl-3,5-diethyl-1,2-dihydropyridine;
N-phenyl-2-propyl-3,5-diethyl-1,2-dihydropyridine;
N-(4'-methoxyphenyl)-2-propyl-3,5-diethyl-1,2-dihydropyridine;
N-(cyclohexyl)-2-propyl-3,5-diethyl-1,2-dihydropyridine;
N-benzyl-1,4dihydronicotinamide;
N-trimethylsilyl-1,4-dihydropyridine;
1,4-dihydropyridine;
ethyl-2,4-dimethyl-1,4-dihydronicotinate;
5-methoxy-2,3-dimethylindole,
5-methoxy-2-phenyl-3-methylindole;
2,3-dimethyl-indole;
2,5-dimethylpyrrole
2,4-dimethylpyrrole;
2,4-dimethyl-3-ethyl-pyrrole;
2,4,5-triphenylimidazole;
1-benzyl-2,3-diphenyl dihydropiperazine;
3,4,5,6-tetrahydracarbazole;
A compound of formula:

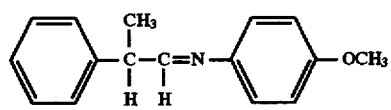

XIX $\Delta^{10}$ Dodecahydroacridine;
1,2,3,4-tetrahydroquinoline;
$\Delta^{19}$ Octahydroquinoline;
2-methyl-3-phenyl-3,4,5,6-tetrahydropyridine;
2-benzyl-3-phenyl-3,4,5,6-tetrahydropyridine;
A Compound of the formula:

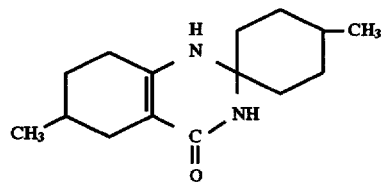

XXV

The auto-oxidisable compound will generally be present in an effective amount for effecting polymerisation of the composition upon exposure to atmospheric oxygen. Such effective amount is generally within the range of from about 0.1 to about 20%, preferably from about 0.1 to about 10%, more preferably from about 0.5 to about 5%, based on the weight of the polymerisable composition.

WEAK ACID

The weak acid when required is an acid other than a mineral acid. The pKa of the weak acid normally is no lower than about 0.5 with the preferred limit being about 0.9. The upper limit is approximately 13, more preferably 11.5. However, carboxylic acids which have a pKa of up to about 8, preferably 6 or 7 are particularly suitable.

The carboxylic acids may contain one or more carboxyl groups, suitably 1 to 4 and more preferably 1 or 2 carboxyl groups. Suitable aliphatic carboxylic acids are $C_{1-18}$ and preferably $C_{1-10}$ monocarboxylic acids.

The choice of the acid depends to a large extent on the auto-oxidisable material being used. Suitable acids may be monobasic or polybasic. Typical but not limiting examples of suitable acids are formic acid, acetic acid, propionic acid, maleic acid, malic acid, fumaric acid, acrylic acid and copolymers thereof, methacrylic acid and copolymers thereof, pyruvic acid, itaconic acid, nadic acid, benzoic acid, phthalic acids, cinnamic acid, trichloroacetic acid and saccharin. The effective amount of the acid is generally within the range from about 0.1 to about 20%, preferably from about 0.1 to about 10%, more preferably from about 0.5 to about 5% based on the weight of the polymerisable composition. The composition may optionally further comprise reducing agents, thickeners, fillers, pigments and free radical polymerisation stabilisers.

Suitable reducing agents may be, but are not limited to, acetylphenylhydrazine, tetramethylthiourea or thiocaprolactam.

It is also possible to add inert filling materials such as finely divided silica, fumed silica (treated or untreated), montmorillonite, clay, bentonite and the like. The use of micronized silica would result in a paste-like thixotropic composition.

Additionally, it is conventional to include in adhesive formulations certain "inert" fillers such as wood flour, glass fibers, cotton linters, mica, alumina, silica and the like to modify viscosity, improve impact resistance and for other purposes. Such fillers could be incorporated in the formulations of the present invention.

Small percentages of silane monomers could also be added to increase moisture resistance, as well as to enhance bonding of a PVC substrate to glass and similar surfaces. Other substances such as dyes, fire retarders, stabilizers such as quinones and hydroquinones, thixotropes, plasticizers, antioxidants, and the like may also be included, although such additives may often be furnished in the principal ingredients, making their separate introduction unnecessary.

Peroxides, or peroxide percursors which produce peroxide in the absence of air, or any ingredient which is a significant source of radicals in the absence of air, should not be included in the compositions, so that polymerisation of the free-radically polymerisable monomer does not commence until it is exposed to oxygen.

The compositions used in the present invention may suitably comprise 0.1 to 20% by weight of the auto-oxidisable compound, 0.1% to 20% by weight of the weak acid (if present) and at least 10% by weight of the free-radically polymerisable monomer with polymeric filler dissolved therein, optionally with the ionic salt, pigments, reducing agents and/or stabilisers, the total constituents adding up to 100%.

The above-described copositions are stable when prepared in the absence of air. Exposure to air results in the polymerisation of the composition, the polymerisation being sustained in the presence or absence of air once the initial exposure to air has taken place. Typically the exposure to air should be for at least about 5 seconds, preferably not less than 30 seconds, more preferably 1 to 5 minutes.

The composition may be agitated during its exposure to oxygen to accelerate activation by introducing oxygen into the composition. The purpose of agitation is to increase the surface area of the composition exposed to the oxygen. For example the composition may be applied to a substrate in finely divided form e.g. by spraying or in the form of a foam. The composition may be packaged in and/or dispensed from a container having a nozzle which entrains air as the composition is dispensed e.g. an aerosol container or pump-action aspirator. In addition, or alternatively, the composition may be agitated on the substrate e.g. by stirring. Agitation of the composition also improves cure-through-volume (CTV) in a layer having significant depth.

The invention further provides a composition as described above packaged in an aerosol container or pump-action aspirator.

The compositions of the invention are true one-component polymerizable compositions and are thus much simpler to use than two-component compositions for bonding PVC, and yet they have good stability when formulated under oxygen-free conditions and stored in a sealed container under inert gas. The compositions have rapid fixture times, good bond strengths, low sensitivity to bond gaps, and contain no volatile non-polymerisable components.

The invention may be more fully understood with reference to the following examples. The poly (methylmethacrylate)—"PMMA"—used in the examples was of molecular weight 120,000 and was supplied by Aldrich Chemical Company Limited (UK).

EXAMPLE 1

Adhesive formulations were prepared by formulating in the proportions outlined in the table 1a below hydroxypropyl methacrylate (HPMA), 30% polymethyl methacrylate dissolved in methyl methacrylate (30% PMMA/MMA), methacrylic acid, and 0.1% iron solution (in the form of ferric acetylacetonate dissolved in HPMA). This formulation was added to an aluminum tube and exposed to a steady stream of inert gas such as nitrogen through a syringe needle for at least two minutes. N-phenyl-2-propyl-3,5-diethyl-1,2-dihydropyridine (DHP) was added to the formulation under the inert atmosphere. The aluminum tub was then sealed by crimping, thus trapping inert gas in the head space above the formulation. The aluminum tube was shaken for 10–20 seconds to ensure thorough mixing of the formulation components.

TABLE 1a

|  | 1a | 1b | 1c | 1d |
|---|---|---|---|---|
| HPMA | 90% | 80% | 45% | 5% |
| 30% PMMA/MMA | 0% | 10% | 45% | 85% |
| Fe (III) | 50 ppm | 50 ppm | 50 ppm | 50 ppm |
| DHP | 5% | 5% | 5% | 5% |
| Methacrylic acid | 5% | 5% | 5% | 5% |

The adhesive was tested as follows:- samples of the adhesive were squeezed from the aluminum tube and spread onto pvc test-pieces (4×1 inches) to form a film of approximately 0.1 mm in depth and exposed to air for a measured interval (hereafter referred to as the open time). Following the open time the pvc test-pieces were brought together to form an adhesive joint with 0.5 inch overlap. The bonds strengths for bond assembled using the above procedure and allowed to cure for 24 hours were tested according to ASTM- D1002 and are presented in table 1b.

TABLE 1b

| Formulation No. | Open Times/Minutes | Shear Strengths/MPa |
|---|---|---|
| 1a | 0.5 | 0.12 |
| 1b | 0.5 | 0.7 |
| 1c | 0.5 | 2.06 |
| 1d | 0.5 | 4.8 |

EXAMPLE 2

Adhesive formulations identical to those used in Example 1 were used to prepare adhesive joints with 0.5 inch overlap.

Wire shims (0.125 mm in diameter) were placed on the pvc test pieces to ensure that the adhesive formed a fillet (0.125 mm) at the bondline between the two test pieces. The bonds strengths for bonds assembled using the above procedure and allowed to cure for 24 hours were tested according to ASTM- D1002 and are presented in table 2.

TABLE 2

| Formulation No. | Open Times/Minutes | Shear Strengths/MPa |
|---|---|---|
| 1a | 2 | 2.34 |
| 1b | 2 | 3.37 |
| 1c | 2 | 6.2 |
| 1d | 2 | 5.88 |

EXAMPLE 3

An adhesive formulation was prepared using the procedure described in example 1 by formulating a solution containing 30% PMMA in methyl methacrylate (8.5 g), a solution of cyclohexyl methacrylate containing 0.1% ferric (acetylacetonate)$_3$ (0.5 g), N-phenyl-2-propyl-3,5-diethyl-1,2-dihydropyridine (0.5 g) and methacrylic acid (0.5 g). The adhesive performance of the formulation was tested as outlined in example 1 on pvc substrates and the results are presented in table 3. As a result of activation by exposure to air, rapid fixturing was observed and the exact times required by the bonded assembly to support a 3 kg weight were determined and are presented below.

TABLE 3

| Open Times/Minutes | Fixture Times/Minutes | Shear Strengths/MPa |
|---|---|---|
| 2 | 7.0 | 3.9 |
| 4 | 6.0 | 4.1 |

EXAMPLE 4

An adhesive formulation identical to that used in example 3 was used to prepare adhesive joints containing wire spacers of 0.5 mm thickness such that the adhesive filled a gap of 0.5 mm between the pvc substrates to be bonded. The adhesive joints gave the following results when tested:

TABLE 4

| Open Times/Minutes | Shear Strengths/MPa |
|---|---|
| 2 | 4.0 |
| 4 | 2.9 |

EXAMPLE 5

An adhesive formulation was prepared using the procedure described in example 1 by formulating a solution containing 30% PMMA in methyl methacrylate, a solution of hydroxypropyl methacrylate containing 0.1% ferric (acetylacetonate)$_3$, N-phenyl-2-propyl-3,5-diethyl-1,2-dihydropyridine and methacrylic acid in the proportions outlined in the following table.

TABLE 5a

|  | a | b | c |
|---|---|---|---|
| HPMA | 5% | 5% | 5% |
| 30% PMMA/MMA | 85% | 88% | 89% |
| Fe (III) | 50 ppm | 50 ppm | 50 ppm |
| DHP | 5% | 5% | 5% |
| Methacrylic acid | 10% | 2% | 1% |

The adhesive performance of the formulation was tested as outlined in example 1 on pvc substrates and the results are presented in table 5b.

TABLE 5b

| Formulation No. | Open Times/Minutes | Shear Strengths/MPa |
|---|---|---|
| 5a | 0.5 | 3.0 |
| 5b | 0.5 | 5.2 |
| 5c | 0.5 | 5.2 |

EXAMPLE 6

An adhesive formulation was prepared using the procedure described in example 1 by formulating a solution containing 30% PMMA in methyl methacrylate (8.5 g), a solution of cyclohexyl methacrylate containing 0.1% ferric (acetylacetonate)$_3$ (0.5 g), N phenyl 2 propyl 3,5 diethyl 1,2 dihydropyridine (0.5 g) and methacrylic acid (0.1 g). The adhesive performance of the formulation was tested as outlined in example 1 on pvc substrates and the results are presented in table 6.

TABLE 6

| Open Times/Minutes | Shear Strengths/MPa |
|---|---|
| 0.5 | 6.9 |
| 1.0 | 4.4 |

EXAMPLE 7

An adhesive formulation was prepared as in example 1 comprising 30% PMMA in methyl methacrylate (2.5 g), hydroxypropyl methacrylate (2.5 g), polyurethane methacrylate (2.5 g), methacrylic acid (0.5 g), saccharin (0.1 g) a solution of cyclohexyl methacrylate containing 0.1% ferric (acetylacetonate)$_3$ (0.4 g), a solution of cyclohexyl methacrylate containing 0.1% cobalt naphthenate (0.1 g) and N-phenyl-2-propyl-3,5-diethyl-1,2-dihydropyridine (1.0 g). The adhesive when tested as in example 1 gave the following results

TABLE 7

| Open Times/Seconds | Fixture Times/Minutes | Shear Strengths/MPa |
|---|---|---|
| 10 | 2.5 | 6.1 |

EXAMPLE 8

An adhesive comprising the components listed in the following table was prepared according to the procedures outlined in example 1.

| | |
|---|---|
| Methacrylated polybutadiene acrylonitrile* | 15% |
| PUMA** | 15% |
| 30% PMMA/MMA | 30% |
| MMA | 25% |
| Fe (III) | 50 ppm |
| DHP | 5% |
| Methacrylic acid | 10% |

*supplied by Monomer Polymer Laboratories. Inc. (U.S.A.)
**PUMA = polyfunctional methacrylated urethane of a type known to be useful for formulating adhesives.

The adhesive performance of the formulation was tested as outlined in example 1 on pvc substrates (abraded with sandpaper) and the results are presented below.

| Open Times/Minutes | Fixture Times/Minutes | Shear Strengths/MPa |
|---|---|---|
| 0.5 | 1.0 | 5.9 |

EXAMPLE 9

An adhesive comprising the components listed in the following table was prepared according to the procedures outlined in example 1.

| | |
|---|---|
| Methacrylated polybutadiene acrylonitrile* | 15% |
| PUMA** | 15% |
| 30% PMMA/MMA | 30% |
| MMA | 25% |
| Fe (III) | 50 ppm |
| DHP | 5% |
| Methacrylic acid | 10% |

*supplied by Monomer Polymer Laboratories. Inc. (U.S.A.)
**PUMA = polyfunctional methacrylated urethane of a type known to be useful for formulating adhesives.

The adhesive performance of the formulation was tested as outlined in example 1 on pvc substrates (abraded with sandpaper) and the results are presented below.

| Open Times/Minutes | Shear Strengths/MPa |
|---|---|
| 0.5 | 4.95 |

We claim:

1. A method of bonding a PVC substrate to another substrate of the same or different material, said method comprising the steps of:
   (a) coating at least one of the substrates with a one-part, air-activatable, polymerizable composition comprising:
      (i) one or more free-radically polymerizable monomers, at least one of which is methylmethacrylate in which is dissolved a polymeric filler, and
   (ii) an activator system for effective polymerization of the free-radically polymerizable monomer, said activator system comprising at least one compound which is auto-oxidisable when exposed to air and which, after exposure to air, is capable of effecting polymerization of the free-radically polymerizable monomer, said auto-oxidisable compound being of a formula which includes the structure II:

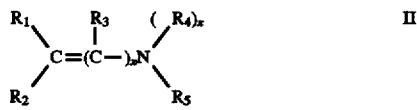

wherein x is 0 or 1, provided that: when x=o, the nitrogen atom in structure II is not bonded to a second nitrogen atom and when x=1, the >C—C< moiety resulting therefrom does not form part of a phenyl ring; and $R_1$, $R_2$, $R_3$, $R_4$, and $R_5$, which may be the same or different, are independently selected from the group consisting of hydrogen, and hydrocarbyl, heterohydrocarbyl, and silyl groups, a monocyclic or a poly-cyclic ring structure formed from any two of the groups $R_1$ to $R_2$, said activator system comprising said auto-oxidisable compound alone or in combination with a weak acid, provided that the composition does not contain a peroxide, or a precursor thereof which produces peroxide in the absence of air, or any ingredient which is a significant source of radicals in the absence of air; said activator system having been combined with said polymerizable monomer under anaerobic conditions; and said polymerizable composition being maintained under anaerobic conditions prior to its application to the substrate;

(b) exposing the coated surface to oxygen for sufficient time to activate polymerization of the composition; and
   (c) bringing together the two substrates.

2. The method of claim 1 wherein the polymeric filler is selected from the group consisting of (i) polymethylmethacrylate, (ii) a copolymer or elastomer soluble in methylmethacrylate selected from polybutadiene, butadiene/acrylonitrile copolymers, elastomeric polyacrylates, polyisoprene, polychloroprene, polyurethane elastomers, vinyl polymers, acrylic polymers (other than polymethylmethacrylate), polyester elastomers, glycol polymers, acrylated epoxies, natural and synthetic rubbers, styrene-butadiene-styrene block copolymers, and acrylic and methacrylic grafted polymers of conjugated dienes; (iii) polymeric acids; and combinations of (i) and (ii).

3. The method of claim 1 wherein the polymeric filler is polymethylmethacrylate.

* * * * *